US012763921B2

(12) United States Patent
McElwee et al.

(10) Patent No.: US 12,763,921 B2
(45) Date of Patent: Oct. 13, 2026

(54) RADIO FREQUENCY FRONT END FOR FDD-TDD CARRIER AGGREGATION SYSTEMS AND METHODS

(71) Applicant: pSemi Corporation, San Diego, CA (US)

(72) Inventors: James Francis McElwee, Austin, TX (US); Peter Bacon, Derry, NH (US)

(73) Assignee: pSemi Corporation, San Diego, CA (US)

( * ) Notice: Subject to any disclaimer, the term of this patent is extended or adjusted under 35 U.S.C. 154(b) by 362 days.

(21) Appl. No.: 18/434,735

(22) Filed: Feb. 6, 2024

(65) Prior Publication Data

US 2025/0254019 A1 Aug. 7, 2025

(51) Int. Cl.

*H04L 5/14* (2006.01)
*H04B 1/00* (2006.01)
*H04B 1/44* (2006.01)

(52) U.S. Cl.

CPC ......... *H04L 5/1461* (2013.01); *H04B 1/0057* (2013.01); *H04B 1/44* (2013.01)

(58) Field of Classification Search

CPC ........ H04L 5/1461; H04B 1/0057; H04B 1/44
See application file for complete search history.

(56) References Cited

U.S. PATENT DOCUMENTS 7,795,968 B1 9/2010 Li et al.
9,184,731 B2 11/2015 Lam
9,300,286 B2 3/2016 Gaynor et al.
9,397,635 B2 7/2016 Costa
9,438,196 B2 9/2016 Smith et al.
10,038,409 B2 7/2018 Nobbe
10,484,038 B1 11/2019 Kimball
10,715,199 B1 7/2020 Kimball
10,965,026 B2 3/2021 Kimball
11,159,130 B2 10/2021 Daruwalla et al.
11,239,803 B2 2/2022 Daruwalla et al.
11,380,970 B2 7/2022 Ganesan (Continued)

OTHER PUBLICATIONS

Ali Tombak et al., 'Design of High-Order Switches for Multimode Applications on a Silicon-on-Insulator Technology', Oct. 2013, IEEE Transactions on Microwave Theory and Techniques, vol. 61, No. 10, pp. 3639-3649. (Year: 2013).*

*Primary Examiner* — Melvin C Marcelo
(74) *Attorney, Agent, or Firm* — Haynes and Boone, LLP

(57) ABSTRACT

Radio-frequency front end circuitry systems and methods for carrier aggregation include multiple RF signal paths, switching circuitry, and timing control circuitry. The switching circuitry is configured to selectively couple the RF signal paths to an antenna port and includes, for each RF signal path, a thru switch connecting a corresponding RF signal path to the antenna port when activated, and a shunt switch connected between its corresponding signal path and RF ground. The timing control circuitry for each TDD path may include a thru control signal path connecting a control signal to the thru switch and a shunt control signal path with at least one delay element to delay the shunt control signal. The timing control circuitry may include delay elements, a resistor-capacitor circuit and a Schmitt trigger. The timing control circuitry may include a non-overlap circuit for each TDD path to mitigate overlap in switching operations.

20 Claims, 12 Drawing Sheets

(56) References Cited

U.S. PATENT DOCUMENTS

| | | | |
|---|---|---|---|
| 11,581,621 | B2 | 2/2023 | Ganesan |
| 11,671,135 | B2 | 6/2023 | Shrivastava et al. |
| 2015/0236748 | A1 | 8/2015 | Nobbe |
| 2015/0236798 | A1 | 8/2015 | Nobbe |
| 2019/0260415 | A1* | 8/2019 | Shanjani .............. H04B 1/1615 |
| 2019/0334573 | A1 | 10/2019 | Thompson et al. |
| 2021/0021257 | A1 | 1/2021 | Shrivastava et al. |
| 2022/0173703 | A1 | 6/2022 | Ranta et al. |
| 2022/0247441 | A1 | 8/2022 | Cho et al. |
| 2023/0276418 | A1 | 8/2023 | Bacon |
| 2023/0336206 | A1* | 10/2023 | Wloczysiak ........... H04B 1/525 |

* cited by examiner

400

TRANSITION FROM TDD RX & FDD TO TDD TX & FDD

| | THRU_1 | SHUNT_1 | THRU_2 | SHUNT_2 | THRU_3 | SHUNT_3 |
|---|---|---|---|---|---|---|
| TDD RX & FDD | OFF | ON | ON | OFF | ON | OFF |
| *Intermediate State* | OFF | OFF | ON | OFF | OFF | OFF |
| TDD TX & FDD | ON | OFF | ON | OFF | OFF | ON |

450

TRANSITION FROM TDD TX & FDD TO TDD RX & FDD

| | THRU_1 | SHUNT_1 | THRU_2 | SHUNT_2 | THRU_3 | SHUNT_3 |
|---|---|---|---|---|---|---|
| TDD TX & FDD | ON | OFF | ON | OFF | OFF | ON |
| *Intermediate State* | OFF | OFF | ON | OFF | OFF | OFF |
| TDD RX & FDD | OFF | ON | ON | OFF | ON | OFF |

*FIG. 4*

RADIO FREQUENCY FRONT END FOR FDD-TDD CARRIER AGGREGATION SYSTEMS AND METHODS

BACKGROUND

The present disclosure relates generally to radio frequency communications systems and methods, and more particularly for example, to radio frequency front end system and methods for carrier aggregation.

Modern communication systems, including cellular networks, satellite communications, broadcasting systems, and the like, generally operate through the transmission and reception of signals across multiple radio frequency bands. In cases where both time-divisional duplexing (TDD) and frequency-division duplexing (FDD) signals are used concurrently, maintaining low insertion loss and minimizing phase differences between the signals becomes a significant challenge in implementing front end circuitry. TDD and FDD signals involve different transmission and reception timing, which complicates the configuration of the front end circuit. One technique is the use of a phase adjusting circuit to optimize the phase relationship between different signals within the radio-frequency front end circuit. This phase adjustment plays a role in minimizing bit error rates when small phase differences are required for efficient communication.

Despite these efforts, there remains a need for improved radio-frequency front end systems capable of efficiently supporting both TDD and FDD signals. As communication systems become more complex and the demand for higher data rates in existing channels increases, there is an increasing need for more robust and efficient solutions to implement carrier aggregation.

SUMMARY

Embodiments of the present disclosure include improved RF front end systems and methods for TDD-FDD carrier aggregation that enhance communication system performance and reliability. In various embodiments, the RF front end circuitry may be implemented in circuitry of a host system and include multiple RF signal paths, switching circuitry, and timing control circuitry. Switching circuitry may be configured to selectively couple the plurality of RF signal paths to an antenna port and include, for each RF signal path, a thru switch that connects a corresponding RF signal path to the antenna port when activated, and a shunt switch that isolates the corresponding RF signal path when the thru switch is deactivated. Additionally, the timing control circuitry may be configured to activate the shunt switch on a disabled RF signal path and the thru switch on an enabled RF signal path in a sequential manner.

In some embodiments, the RF signal paths include a TDD transmit signal path and a TDD receive signal path, and the switches are set up to alternate between these paths, allowing transmission and reception of TDD signals. The RF signal paths may also include a FDD signal path, facilitating the transmission and reception of FDD signals. This configuration may serve as an RF front end circuit that facilitates carrier aggregation.

The timing control circuitry for each TDD path may include a thru control signal path connecting a control signal to the thru switch and a shunt control signal path with at least one delay element to delay the shunt control signal. The timing control circuitry may further include a resistor-capacitor circuit receiving the delayed shunt control signal and a Schmitt trigger to condition the delayed control signal for output to the shunt switch. In some embodiments, the timing control circuitry may include a non-overlap circuit for each TDD path configured to respond to the control signal, activating one of the TDD transmit or receive paths while deactivating the other.

The scope of the disclosure is defined by the claims, which are incorporated into this section by reference. A more complete understanding of embodiments of the present disclosure will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIG. 4 illustrates example switch timing sequences, in accordance with one or more embodiments of the present disclosure.

Figure 1:
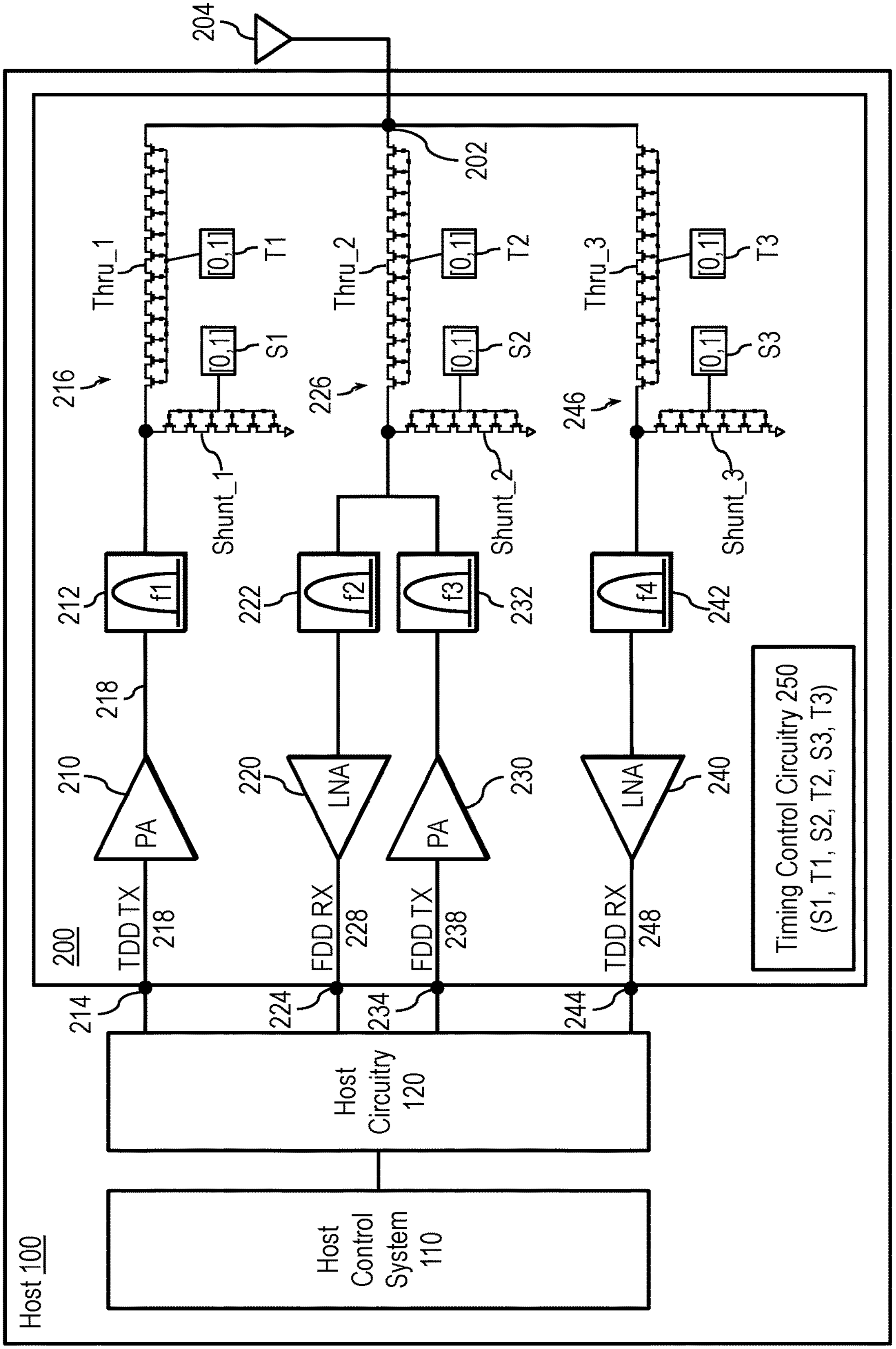
FIG. 1 illustrates an example wireless communications system, in accordance with one or more embodiments of the present disclosure.

Embodiments of the present disclosure and their advantages are best understood by referring to the detailed description that follows. It is noted that sizes of various components and distances between these components are not drawn to scale in the figures. It should be appreciated that like reference numerals are used to identify like elements illustrated in one or more of the figures.

DETAILED DESCRIPTION

The present disclosure describes improved systems and methods for signal switching and/or filtering in radio frequency (RF) front end circuitry, in accordance with various embodiments.

FIG. 1 illustrates an example host system 100 including a radio-frequency front end circuit 200, in accordance with embodiments of the present disclosure. As illustrated, the circuit 200 is configured to support both Time Division Duplex (TDD) and Frequency Division Duplex (FDD) communications. The circuit 200 includes an antenna port 202, which is connected to an antenna 204 for transmitting and receiving RF signals. The circuit 200 also includes a TDD input terminal 214, an FDD output terminal 224, an FDD input terminal 234, and a TDD output terminal 244, which are communicably coupled to the host 100, such as through host circuitry 120 and host control system 110. Switching circuitry (e.g., including switches 216, 226, 246) is configured to selectively couple the antenna port 202 to one or more RF signal paths.

The TDD input terminal 214 is configured to receive TDD signals from the host circuitry 120 for transmission through the antenna 204 via a TDD transmission path, TDD TX 218. The TDD TX 218 path includes a power amplifier 210 configured to amplify the received TDD transmit signal, a band pass filter 212 configured to output the signal in a TDD transmission frequency band, f1. The TDD transmit frequency band f1 may be any frequency band suitable for transmission of the TDD transmit signal, for example, Band 41 (2496 MHz-2690 MHZ) according to the LTE (Long Term Evolution) standard. A switch 216 is configured to connect/disconnect the TDD TX 218 path to/from the antenna port 202.

The TDD output terminal 244 is configured to pass TDD signals received from the antenna 204 via antenna port 202 to the host 100, such as through the host circuitry 120 for processing by host control system 110. The TDD receive path, TDD RX 248, includes a switch 246, configured to connect/disconnect the TDD receive path to/from the antenna port 202 for receiving TDD signals from the antenna 204. The signal is passed through a band pass filter 242 which outputs the signal in a TDD receive frequency band, f4, which may be the same or similar to TDD transmit frequency band f1. The filtered signal is then passed through the low noise amplifier 240 for output to the host circuitry 120 through the TDD output terminal 244.

In various embodiments, the switches 216 and 246 are configured to alternate between a TDD transmission mode and a TDD reception mode, in accordance with TDD signal timing. In some embodiments, the switches 216 and 246 may be implemented through a single switch that alternates communications between the two paths, or via other switch components.

The FDD output terminal 224 is configured to receive FDD signals from the antenna 204 via antenna port 202 for transmission to the host circuitry 120. The FDD receive path, FDD RX 228, includes a bandpass filter 222 configured to receive the FDD signal from the antenna 204, via the antenna port 202 and switch 226, and output a filtered signal in an FDD reception band, f2. The filtered signal is then passed through a low noise amplifier 220 for output to the host circuitry 120 through the FDD output terminal 224.

The FDD input terminal 234 is communicably coupled to the host circuitry 120 for receiving FDD output signals for transmission though the antenna 204 via switch 226 and antenna port 202. The FDD transmission path, FDD TX 238, includes a power amplifier 230 configured to boost the power of the FDD output signal and a band pass filter 232 configured to limit the FDD output signal to an FDD transmission frequency, f3. The switch 226 is configured to connect/disconnect the FDD transmission path FDD TX 238 and the FDD reception path FDD RX 228 to/from the antenna port 202. The FDD communication bands f2 and f3 may be, for example, Band 3 (transmit band: 1710 MHZ-1785 MHZ) of the LTE standard, Band 25 (receive band: 1930 MHz-1995 MHZ) of the LTE standard, or other suitable frequency bands.

In operation, the FDD output terminal 224 and the TDD output terminal 244 are configured to transmit radio frequency signals received from the antenna 204 to the circuitry of the host apparatus, such as the host circuitry 120. The FDD input terminal 234 and the TDD input terminal 214 are configured to transmit radio frequency signals received from the host 100, such as through the host circuitry 120, to the antenna 204 for transmission to another device. The switches 216, 226, and 246 allow the antenna 204 to be selectively connected to one or more of the signal paths TDD TX 218, FDD RX 228/FDD TX 238, and TDD RX 248, depending on the type(s) of signals used for communication. In some embodiments, the switches 216, 226, and 246 are configured to facilitate simultaneous TDD/FDD communications, which may include connecting the switch 226 to the antenna port 202 for FDD simultaneous transmission and reception of FDD signals and controlling switches 216 and 246 to alternate between connecting the TDD transmission path, TDD TX 218, and the TDD receive path, TDD RX 248, in accordance with TDD signal timing.

As illustrated, the circuit 200 may be implemented as an RF front end circuit that enables a host 100 to communicate via wireless communications. The host 100 may be any device and/or system capable or wireless communications, such as a mobile phone, smartwatch, a wireless wearable device, a manned or unmanned vehicle, of other wireless device and/or system. The circuit 200 may operate in TDD modes, FDD modes, and/or carrier aggregation modes. In an implementation of carrier aggregation including simultaneous communication using TDD signals and FDD signals, the switch 226 may be configured to maintain a continuous connection with the FDD communication paths FDD RX 228 and FDD TX 238, and the switches 216 and 246 may be configured to alternately connect to the TDD TX 218 and TDD RX 248 paths. The circuit 200 facilitates simultaneous use of TDD and FDD signal modes as described herein, enabling effective carrier aggregation for concurrent TDD and FDD signal communication. In various implementations, the switches 216, 226, and/or 246 may connect to one or more of the TDD and FDD signal paths and disconnect from unused paths.

In various embodiments, the host control system 110 may include one or more logic devices and memory devices configured to perform operations of the host 100. A logic device may be implemented as a general-purpose processor, a digital signal processor (DSP), an application-specific integrated circuit (ASIC), a microcontroller, a programmable logic device (PLD), a field-programmable gate array (FPGA), or other programmable logic device(s). The logic device and other components may be configured through hardwiring, software execution, or a combination of both. In various embodiments, the host control system 110 includes one or more memory devices designed to retain data, such as software instructions for execution by the logic device. The memory may include volatile and non-volatile memories, such as random-access memory (RAM), dynamic RAM (DRAM), static RAM (SRAM), non-volatile random-access memory (NVRAM), read-only memory (ROM), programmable read-only memory (PROM), erasable programmable read-only memory (EPROM), electrically-erasable programmable read-only memory (EEPROM), flash memory, hard disk drives, or other memory types. The logic device may be configured to execute software instructions residing in the memory, thereby accomplishing method steps and operations.

It will be appreciated that the circuit 200 of FIG. 1 is described at a high-level and that various other components may be included in an implementation. For example, the circuit 200 may include one or more phase adjusting circuits such as described in U.S. Pat. No. 11,677,427, which is incorporated by reference herein in its entirety. Various implementations may further include different numbers of communications paths, antennas, switches, and/or other components.

It has been observed that various implementations of RF front end circuitry that combines FDD and TDD signal paths simultaneously on the same antenna port, such as illustrated in FIG. 1, may generate signal errors during switching operations. In some cases, for example, TDD switching between TDD TX and TDD RX can result in a "glitch" in the FDD signal due to an impedance change at an FDD frequency (e.g., causing an Error Vector Magnitude (EVM) spike). One approach to resolve the glitch is to provide a common TDD TX/RX filter between the switch and the antenna port. This approach mitigates the glitch, but it constrains the filter options. For example, the TX filter may be selected with a larger filter loss to achieve higher attenuation required for the transmission signal, while the RX filter may be selected with a lower target impedance (e.g., a 50-ohm target impedance), which is not suitable for optimizing TX performance.

Switching at the antenna port (e.g., antenna port 202 as illustrated in FIG. 1) allows for optimal filter selection for each of the TDD TX and TDD RX paths (e.g., filters may be selected for target noise constraints, reliability in transmit SAW, insertion loss, etc.), and improved performance, but it adds to the complexity. Thus, a challenge addressed by the present disclosure is to operate with separate TDD TX and RX filters without performance degradation.

In various embodiments described herein, efficient implementations with separate TDD TX and RX filters, such as illustrated in FIG. 1, are disclosed with a TDD TX/RX switchover that is carefully designed to avoid sudden impedance changes (and associated gain/phase changes) presented to the FDD path. As illustrated, each switch of the switching circuitry (switch 216, switch 226, and switch 246) includes a thru switch and a shunt switch, which are operable to selectively couple the corresponding signal path to the antenna 204 via antenna port 202. TDD TX switch 216 includes a thru switch, Thru_1, and a shunt switch, Shunt_1, which include a plurality of transistors, selected in accordance with circuit requirements for the implementation.

In some implementations, the size of the Thru_1 switch and the Shunt_1 switch may be different (e.g., include different numbers of transistors), with the Thru_1 switch being larger than the Shunt_1 switch. The Shunt_1 switch is enabled/disabled by a control signal S1 (e.g., providing high or low signal value, 0-Off/1=ON, etc.), and the Thru_1 switch is enabled by a control signal T1. TDD RX switch 246 may be similarly configured with a thru switch Thru_3 controlled by a thru control signal T3, and a shunt switch Shunt_3 controlled by a shunt control signal S3. FDD switch 226 may be similarly configured with a thru switch Thru_2 controlled by a thru control signal T2, and a shunt switch Shunt_2, enabled/disabled by a shunt control signal S2.

In operation each of the thru switches (Thru_1, Thru_2, and Thru_3) are disposed between the corresponding signal path and the antenna port 202 to selectively couple the corresponding signal path to the antenna port 202 when enabled (e.g., when a "1" or high control input is provided). Each of the shunt switches (Shunt_1, Shunt_2, and Shunt_3) is connected between its corresponding signal path and RF ground. When enabled, each shunt switch is configured to isolate the corresponding signal path when the corresponding thru switch is disabled.

Switching operations may be controlled by timing control circuitry 250, which is configured to activate the shunt switch and disable a thru switch on a disabled signal path and disable the shunt switch and activate the thru switch on an enabled signal path. In some embodiments, the timing control circuitry 250 may be configured to control TDD switching between the TDD TX 218 path to transmit a TDD signal through the antenna 204, and the TDD RX 248 signal path to receive a TDD signal via the antenna 204. In some embodiments, the timing control circuitry 250 is configured to mitigate FDD signal interference during TDD switching in a carrier aggregation mode. The timing control circuitry 250 may be configured and/or scaled to adapt to different RF front end scenarios, including varying transistor sizes (e.g., of the switches 216, 226, and/or 246), filter properties, and process dimensions.

Figure 2:
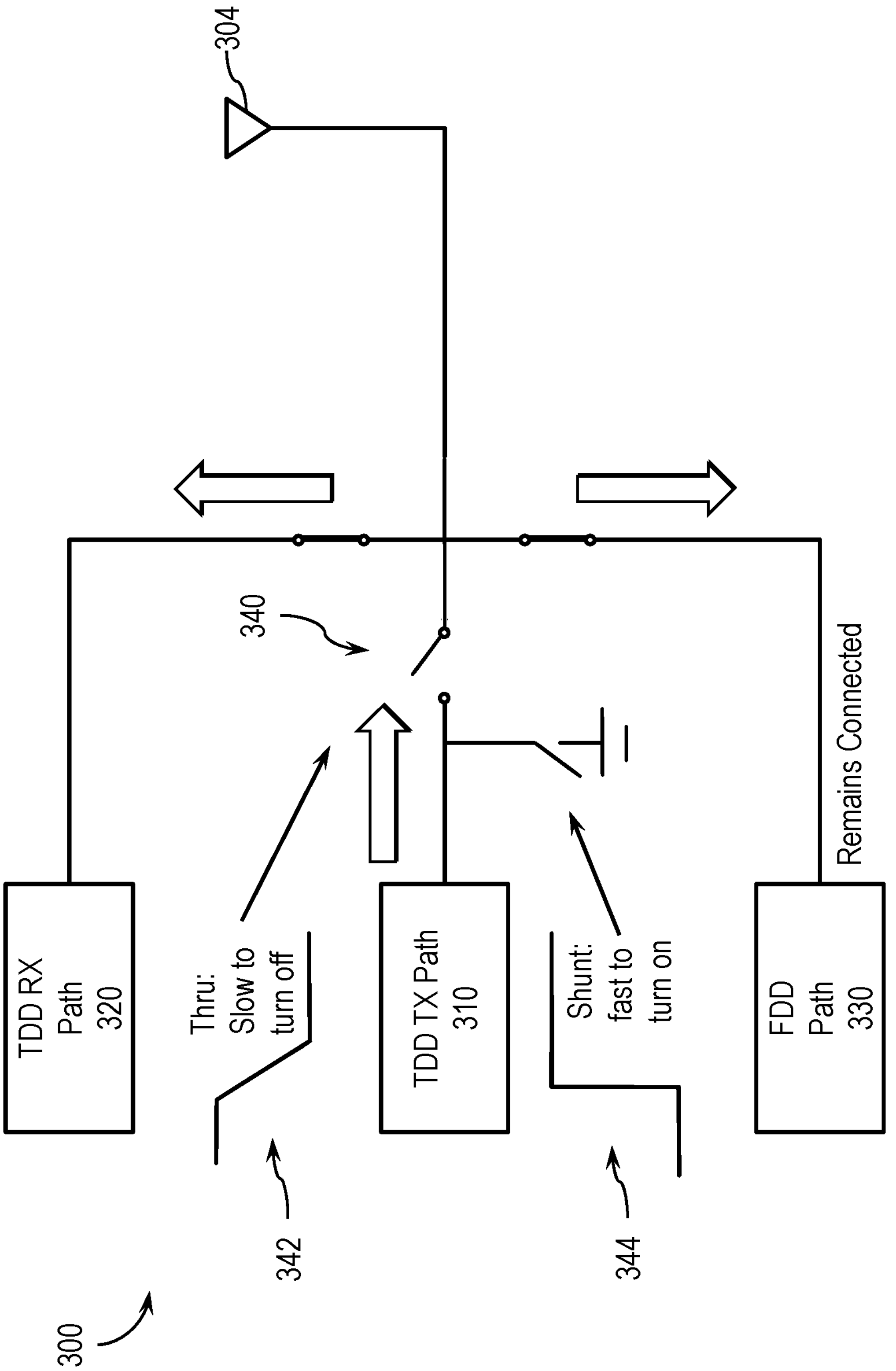
FIG. 2 illustrates example switching operations of a radio-frequency front end circuit, in accordance with one or more embodiments of the present disclosure.

Referring to FIG. 2, switching operations of an RF front end circuit 300 will now be described, in accordance with embodiments of the present disclosure. The circuit 300 is configured to implemented TDD-FDD carrier aggregation and includes a TDD TX path 310, a TDD RX path 320, and an FDD path 330, which is used for simultaneous FDD TX/RX communications. Each transmission path is selectively connected to an antenna 304 via a switch, such as switch 340, which includes a thru switch connecting the transmission path to the antenna 304, and a shunt switch which is enabled when the corresponding transmission path is disconnected from the antenna 304. In operation, the FDD path 330 remains connected to the antenna during operation, and the TDD TX path 310 and TDD RX path 320 are alternately connected/disconnected to facilitate TDD communications.

In operation, the thru switch and shunt switch are enabled/disabled at different speeds. For example, the thru switch and shunt switch may include different numbers of transistors such that the thru switch, which is larger, is relatively slow to turn off (e.g., as illustrated by signal 342), and the shunt switch, which is smaller, is relatively fast to turn on (e.g., as illustrated by signal 344). In various implementations, design considerations may result in the thru switch being much bigger and/or containing more components than the shunt switch. As a result, when switching between the TDD TX path 310 and the TDD RX path 320, the shunt switches of the paths may be enabled/disabled before the thru switches are disabled/enabled.

Figure 3A:
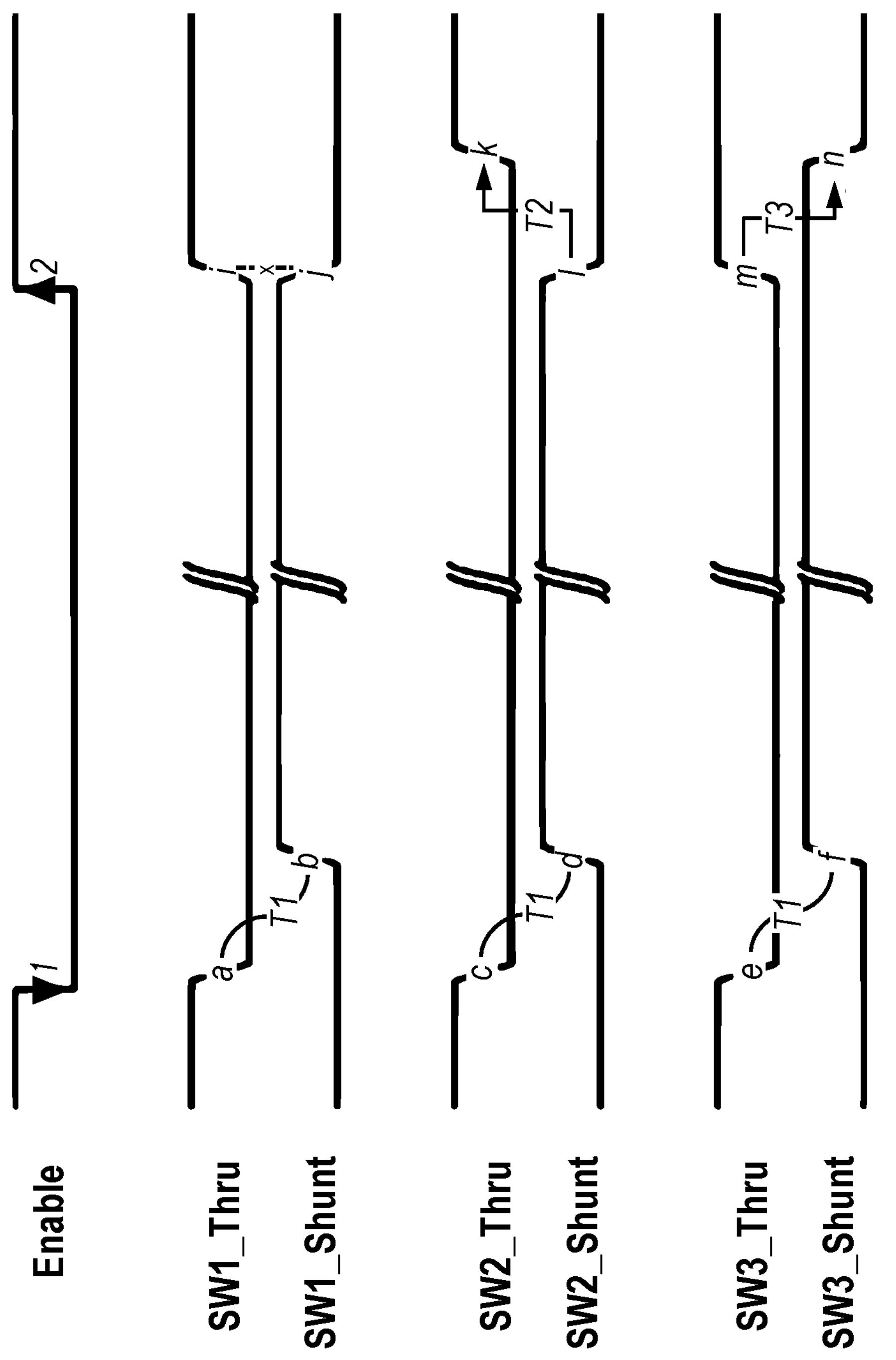
FIG. 3A is an example timing diagram illustrating switching scenarios, in accordance with one or more embodiments of the present disclosure.

FIG. 3A illustrates a timing diagram illustrating various switching scenarios, in accordance with embodiments of the present disclosure. When the switch Enable signal goes low (e.g., at 1), the TDD switch is disabled (e.g., the thru switch is disabled, and the shunt switch is enabled). When the switch Enable signal goes high (e.g., at 2), a TDD switch is enabled (e.g., the thru switch is enabled, and the shunt switch is disabled). In a first scenario (SW1), a timing delay may be added, as shown by T1, to delay enabling the shunt path to account for the difference in the speed of the thru and shunt switches in disabling the TDD filter path and prevent inadvertent shunting due to the switching timing issue. In a second scenario (SW2), a second timing delay is added, as shown by T2, when the TDD filter path is enabled causing the Thru path to enable after the Shunt is disabled. In a third scenario, a third timing delay is added, as shown by T3, when the TDD path is enabled causing the Thru path to enable before the Shunt is disabled While the first scenario addresses the initial transition disabling a TDD signal path, the second and third scenarios address enabling the TDD path for different switch sequences to mitigate the EVM glitch.

Figure 3B:
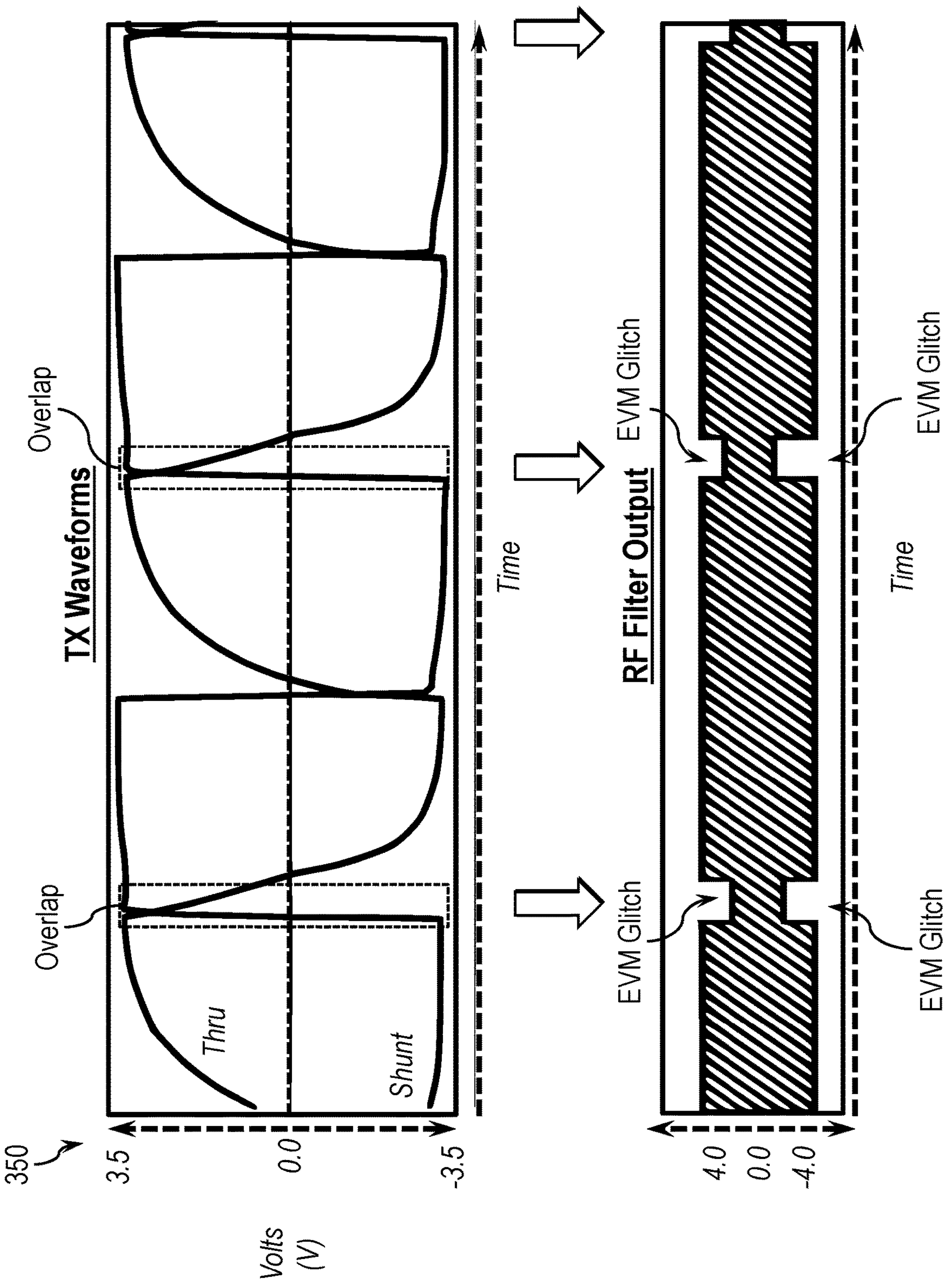
FIG. 3B illustrates example thru switch and shunt switch timing, in accordance with one or more embodiments of the present disclosure.

Referring to FIG. 3B, example thru switch and shunt switch timing 350 are illustrated, in accordance with embodiments of the present disclosure. In the illustrated signal diagram, the shunt switch goes high at a faster rate than the thru switch turns off, creating an "Overlap" that causes corresponding "EVM glitches" at the filter output. These EVM glitches illustrate where the Overlap causes signal quality issues that are addressed by the present disclosure. In various embodiments, circuitry and/or control logic is provided to break (disabled) the shunt before the thru connection is made (enabled). As illustrated in FIG. 3A, these timing issues can occur at the when the filter path is disabled (e.g., as illustrated by delay T1) and/or when the filter path is enabled (e.g., as illustrated by delay T2/T3).

In various embodiments, it is desirable to maintain specific impedance characteristics within the output band of the band pass filters to mitigate the negative impact of switching between different frequency bands and modes on signal quality. For example, in some embodiments, the RF front end circuitry is designed to maintain approximately 50 ohms (or other value as appropriate for the specific implementation) across all filters. The EVM glitches caused by the switching may adversely affect signal quality, particularly in terms of interaction with other frequency bands. Two implementation considerations are the transition between states and the steady-state differences during operation.

Figure 3C:
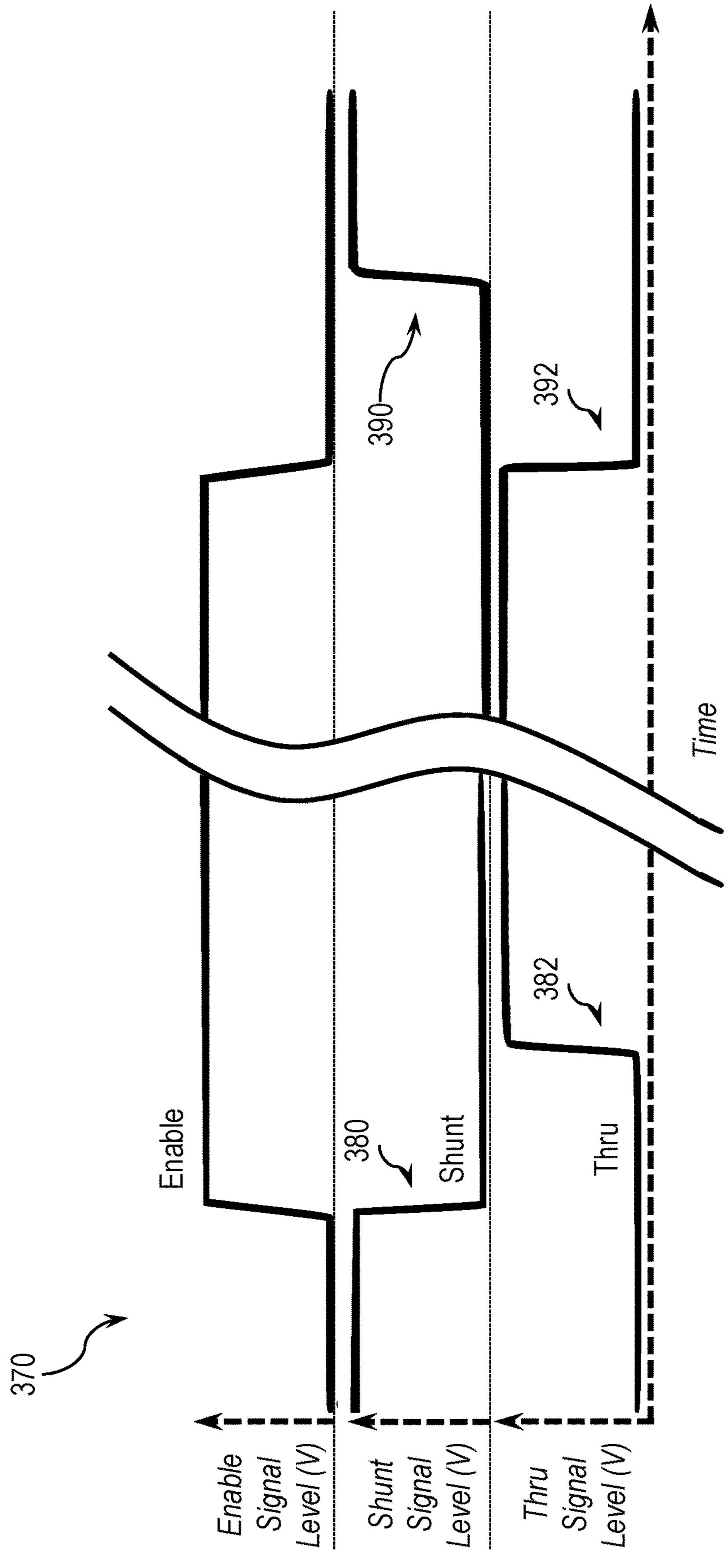
FIG. 3C illustrates an example timing diagram illustrating additional switching scenarios, in accordance with one or more embodiments of the present disclosure.

The switching signal levels are further illustrated in the timing diagram 370 of FIG. 3C, in accordance with embodiments of the present disclosure. As illustrated, when the Enable signal goes high, the shunt switch is turned off at time 380. The thru switch is delayed until time 382 to avoid overlap with the shunt transition. This operation may be referred to as a shunt break, before a thru make. When the Enable signal goes low, the thru switch is turned off at time 392. The shunt switch is delayed until time 390 to avoid overlap with the thru transition.

For some cases of relatively smaller propagation delay on the shunt gate, it may not be necessary to delay the falling edge of the shunt signal because the gate turns off fast enough to avoid the EVM glitch issue. In some embodiments, the EVM glitch issue may be caused by the shunt rising edge, which was rising too fast. In various other implementations, the EVM glitch issue may be present at the rising and/or falling edges and mitigated as described herein.

Referring to FIGS. 1 and 4, example switch timing sequences will now be described, in accordance with embodiments of the present disclosure. In the illustrated embodiment, a switch sequence 400 illustrates a transition from TDD RX to TDD TX, with the FDD paths continuously connected in a TDD-FDD carrier aggregation scenario. In the initial state, the TDD RX path 248 is connected to the antenna port 202 via switch 246 (Thru_3=1; Shunt_3-0), the FDD signal paths 228/238 are connected to the antenna port 202 via switch 226 (Thru_2=1; Shunt_2-0)), and the TDD TX path 218 is disconnected from the antenna port at switch 216 (Shunt_1=1; Thru_1-0). To switch from the TDD RX path 248 to the TDD TX path 218, an intermediate state is entered in which switch 246 and switch 216 are shut off (e.g., Shunt_1-0 and Thru_3=0). Next, the TDD TX path 218 is connected to the antenna port 202 via switch 216 (e.g., Thru_1=1) and the TDD RX path 248 is shunted (e.g., Shunt_3=1).

In the illustrated embodiment, a switch sequence 450 illustrates a transition from TDD TX to TDD RX, with the FDD paths continuously connected in a TDD-FDD carrier aggregation scenario. In the initial state, the TDD TX path 218 is connected to the antenna port 202 via switch 216 (Thru_1=1; Shunt_1=0), the FDD signal paths 228/238 are connected to the antenna port 202 via switch 226 (Thru_2=1; Shunt_2=0)), and the TDD RX path 248 is disconnected from the antenna port at switch 216 (Shunt_3=1; Thru_3=0). To switch from the TDD TX path 218 to the TDD RX path 248, an intermediate state is entered in which switch 216 and switch 246 are shut off (e.g., Shunt_3=0 and Thru_1=0). Next, the TDD RX path 248 is connected to the antenna port 202 via switch 246 (e.g., Thru_3=1) and the TDD TX path 218 is shunted (e.g., Shunt_1=1).

Figure 5:
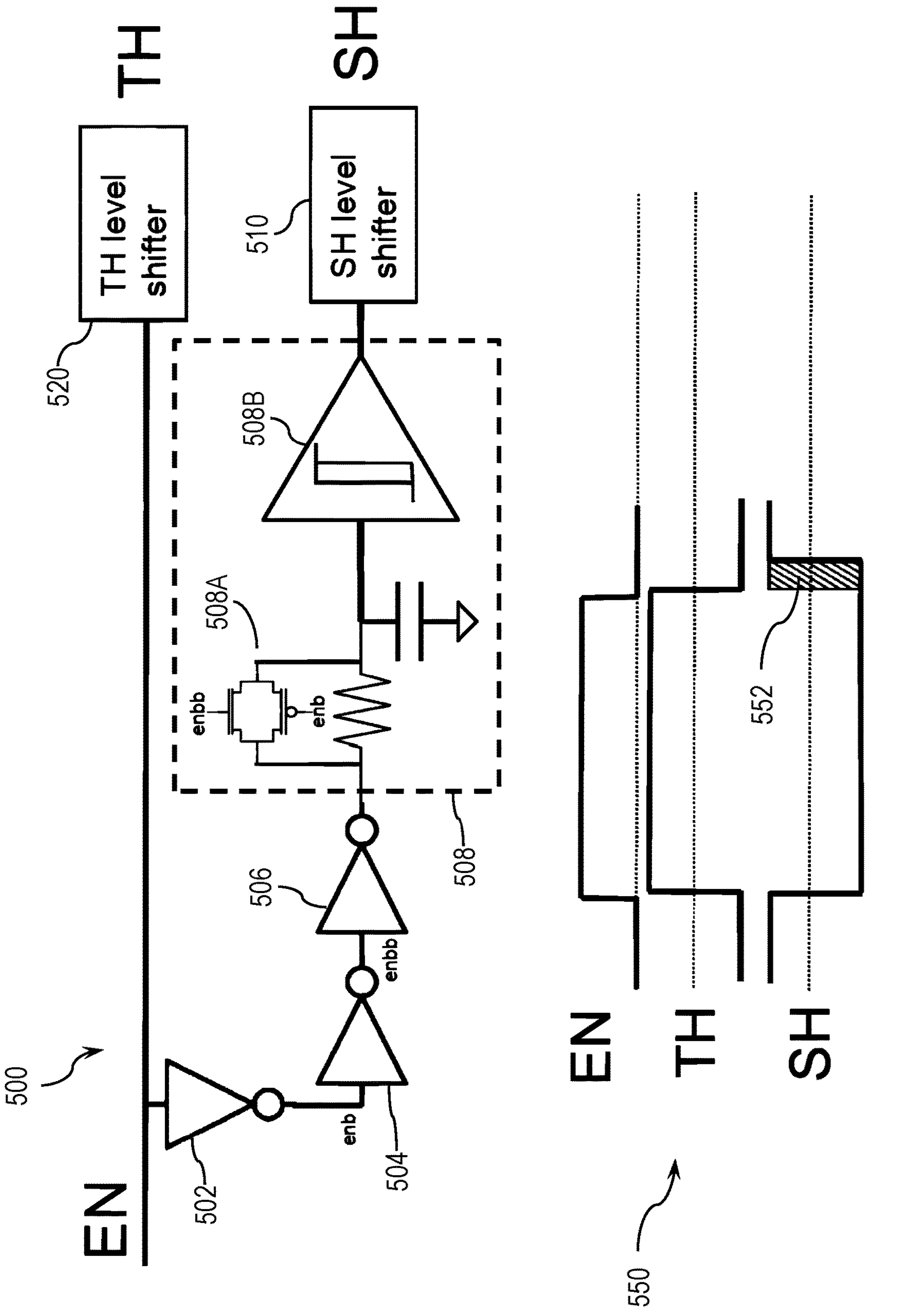
FIG. 5 illustrates example circuitry for mitigating EVM glitches during switching, in accordance with one or more embodiments of the present disclosure.

Referring to FIG. 5, embodiments of circuitry 500 for mitigating EVM glitches will now be described, in accordance with embodiments of the present disclosure. In some embodiments, the circuitry 500 may be implemented in accordance with the embodiments illustrated in FIGS. 1-4 to add timing delays to mitigate EVM glitches. In various embodiments, the EVM glitches may appear as a result of shunt/thru switch timing overlap and can be addressed by incorporating delay elements into the enable signal path. In the illustrated embodiment, only the rising shunt delay is needed because of the time constants of the example implementation. Other delay configurations may be implemented as desirable to avoid overlap in other circuit implementations (e.g., when delay is needed for the falling shunt control signal). This circuitry 500 is edge/direction selective depending on which edges are rising or falling.

As illustrated, a plurality of delay elements 502, 504, and 506 (e.g., inverters or other circuit components) are disposed in the shunt enable path. The shunt enable path may also include a level sensitive delay cell 508 (e.g., including a Schmitt trigger delay circuit 508B). In some embodiments, the delay cell 508 may be programmable (e.g., two values). The series resistor 508A may be either shorted out or not shorted out, and the Schmitt trigger 508B functions to mitigate bounces.

The added delay (illustrated, for example, as delay 552 in signal diagram 550) creates time for the thru gate signal to settle to "off" before the shunt switch device is switched on. Depending on the TX and RX surface acoustic wave (SAW) impedance presented to the FDD path and system tolerance to FDD gain/phase jumps, it may be desirable to control TX and RX overlap/nonoverlap. For example, if TX and RX are both "off" momentarily, FDD impedance could spike during that time. A TH level shifter 520 and SH level shifter 510 are provided at the outputs of the circuitry 500 to generate the switching control signals for each of the thru switch and shunt switch.

The circuit 500 of FIG. 5 illustrates one approach for mitigating and/or avoiding impedance changes in RF front end circuitry for use with FDD-TDD carrier aggregation. The use of delay cells disposed in the circuit 500 to ensure a shunt/break occurs before a thru/make allows for programmability and mitigates undesirable values of a gate resistor (e.g., a very large gate resistor). The circuit 500 mitigates issues with the FDD filter being exposed to an impedance glitch if thru-shunt (and TX-RX) timing is not carefully controlled.

Figure 6:
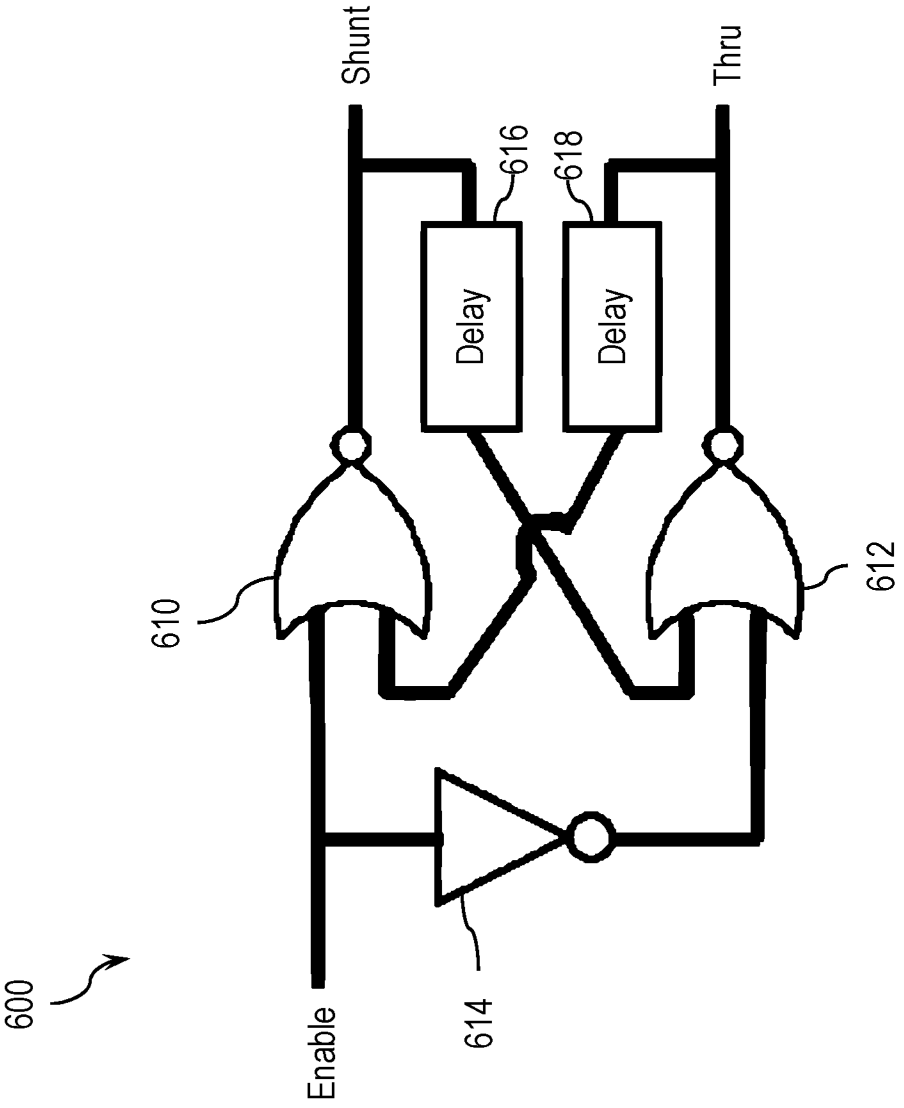
FIG. 6 illustrates an overlap circuit for mitigating EVM glitches during switching, in accordance with one or more embodiments of the present disclosure.

Referring to FIG. 6, another embodiment of a circuit for mitigating EVM glitches will now be described, in accordance with embodiment of the present disclosure. The circuit of FIG. 6 may be used in place the circuit 500 of FIG. 6 in some implementations. As illustrated, the circuit is implemented as a non-overlap generator circuit 600 configured to implement a time delay between the switched signals and includes NOR gates 610 and 612, an inverter 614, and delay elements 616 and 618. Implementation of the non-overlap generator 600 can help avoid the scenario where the TDD transmit filter and TDD receive filter are simultaneously active. It will be appreciated that other non-overlap generator configurations may be implemented in accordance with the present disclosure (e.g., a level shifting function may be incorporated into the design).

In operation, an Enable input signal controls the operation of the non-overlap generator 600. When Enable goes high, the shunt signal goes low. The Thru signal remains low until the signal propagates through the delay element 616 to the bottom NOR 612 and then out. When enabled, the non-overlap generator 600 introduces timing delays through the delay elements 616 and 618, which triggers the shunt control before the thru control, creating a time gap to avoid overlap during switching. When disabled, the signals can bypass the delay elements. In various embodiments, the delay cells 616 and 618 may be implemented using a set/reset latch circuitry or other appropriate delay components. Although a NOR implementation is illustrated, it will be appreciated that NAND implementations or other implementations may also be used. The delays in this circuitry can be programmed and scaled, making it adaptable to different scenarios, including varying transistor sizes and process dimensions.

The circuits of FIGS. 5 and 6 address challenges related to separating transmit (TX) and receive (RX) paths using separate filters, such as separate TDD paths in a TDD-FDD carrier aggregation implementation. By separating the TX and RX paths, the RF front end can be implemented with improved noise and reliability, compared with a single path approach. In operation, the FDD downlink path is constantly present, which presents switching challenges. As previously discussed, the relatively small shunt switch's rapid transition creates overlap with the slower thru switch, causing an EVM glitch in the FDD filtered signal. The circuits of FIGS. 5 and 6 allows for precise switching/timing to mitigate these EVM glitches.

Figure 7:
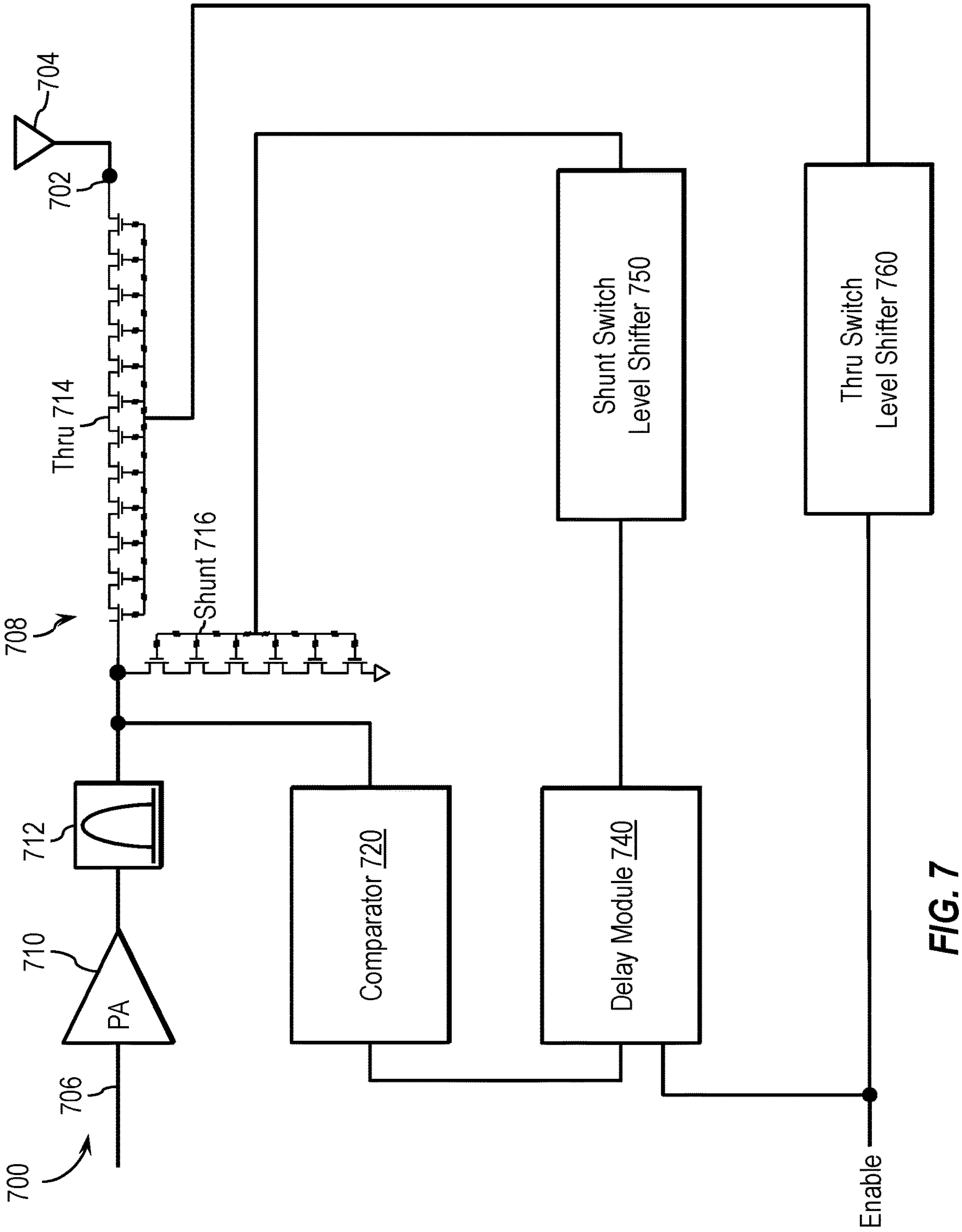
FIG. 7 illustrates example front end circuitry including timing control circuitry, in accordance with one or more embodiments of the present disclosure.

FIG. 7 illustrates an implementation of front end circuitry 700 that includes the shunt switch/thru switch control timing as described herein, in accordance with embodiments of the disclosure. The circuitry 700 may be implemented in an RF front end circuit, such as circuit 200 of FIG. 1. The circuitry 700 includes a radio-frequency transmission path 706, which may be implemented as a TDD TX path, such as TDD TX path 218 illustrated in FIG. 1. The switching elements of circuitry 700, including switch 708 which includes thru switch 714 and shunt switch 716 which are enabled by an Enable signal, comparator 720, delay module 740, shunt switch level shifter 750 and/or thru switch level shifter 760, may be implemented in one or more other transmission and reception paths of the RF front end circuitry, such as TDD RX path 248.

The transmission path 706 receives an RF signal for transmission through antenna 704, such as from a host system. The received signal is amplifier by power amplifier 710 and passes through a band pass filter 712 to generate a signal in the TDD transmission frequency band. The signal passed through the Thru switch 714 which, when enabled, connects the transmission path 706 to the antenna 704 via antenna port 702. The comparator 720 and delay module 740 include circuitry configured to control the timing of the enable signal to the Thru switch 714 and Shunt switch 716, such as disclosed herein in FIGS. 1-6 to mitigate EVM glitches. In some embodiments, the comparator 720 and delay module 740 may be implemented as circuitry such as illustrated in the circuit 500 of FIG. 5 which includes, respectively, a level sensitive delay cell 508 and a plurality of delay elements 502, 504, and 506. In some embodiments, the circuitry 700 is implemented with the overlap circuit 600 of FIG. 6.

The RF front end circuitry 700 may be implemented in circuitry of a host system comprising multiple RF signal paths and timing control circuitry, such as described with reference to FIG. 1. Switching circuitry is configured to selectively couple the plurality of RF signal paths to an antenna port, the switching circuitry including, for each of the plurality of RF signal paths, a thru switch that connects a corresponding RF signal path to the antenna port when activated, and a shunt switch connected between its corresponding signal path and RF ground. The shunt switch isolates the corresponding RF signal path when the thru switch is deactivated. Additionally, the timing control circuitry is configured to activate the shunt switch on a disabled RF signal path and the thru switch on an enabled RF signal path in a sequential manner.

In some configurations, the RF signal paths include a time-division duplexing (TDD) transmit signal path and a TDD receive signal path, and the switches are set up to alternate between these paths, allowing transmission and reception of TDD signals. The RF signal paths may also include a frequency division duplexing (FDD) signal path, facilitating the transmission and reception of FDD signals. This configuration serves as an RF front end circuit that facilitates carrier aggregation.

The timing control circuitry for each TDD path includes a thru control signal path connecting a control signal to the thru switch and a shunt control signal path with at least one delay element to delay the shunt control signal. The latter may include a resistor-capacitor circuit receiving the delayed shunt control signal and a Schmitt trigger to condition the delayed control signal for output to the shunt switch. In some embodiments, the timing control circuitry may include a non-overlap circuit for each TDD path configured to respond to the control signal, activating one of the TDD transmit or receive paths while deactivating the other, ensuring no overlap in their operations.

Figure 8:
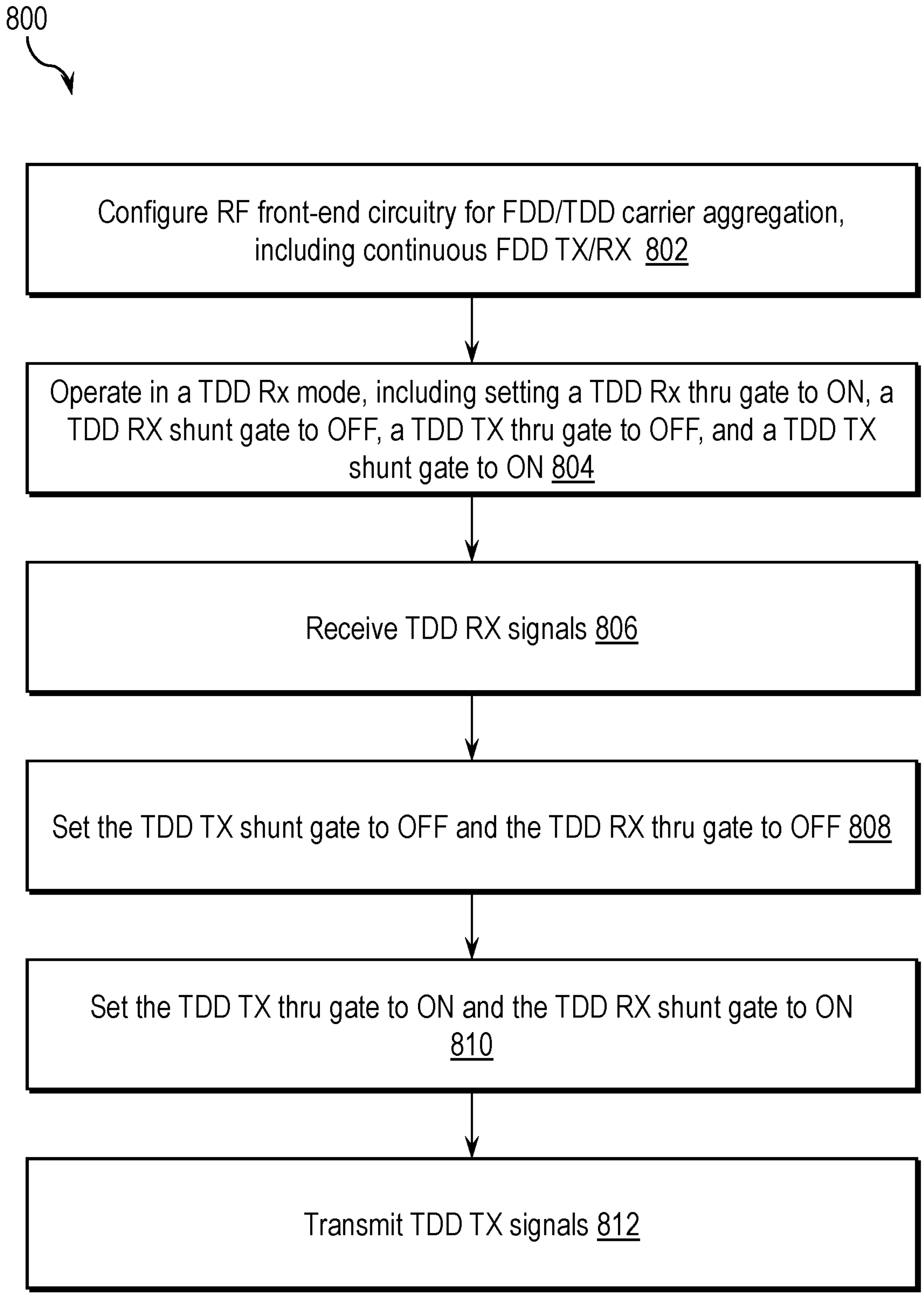
FIG. 8 illustrates an example switching process for switching between a TDD RX mode to a TDD TX mode, in accordance with one or more embodiments of the present disclosure.

FIG. 8 illustrates an example switching process 800 for switching between a TDD RX mode to a TDD TX mode, in accordance with one or more embodiments. In operation 802, RF front end circuitry (e.g., circuitry described with reference to FIGS. 1-7) is configured for FDD/TDD carrier aggregation, including continuous FDD TX/RX paths. In operation 804, the circuitry operates in a TDD RX mode, including setting a TDD RX thru switch to ON, a TDD RX shunt switch to OFF, a TDD TX thru switch to OFF, and a TDD TX shunt switch to ON. The FDD TX/RX path is also switched on for continuous processing, including setting an FDD thru switch to ON and a FDD shunt switch to OFF. In this configuration, the circuitry receives TDD RX signals (operation 806).

In operation 808, the timing control circuitry begins transition to the TDD TX mode by setting the TDD TX shunt gate to OFF and the TDD RX thru gate to OFF. In operation 810, the timing control circuitry sets the TDD TX thru gate to ON and the TDD RX shunt gate to ON. In this configuration, the circuitry is capable of transmitting TDD TX signals (operation 812).

Figure 9:
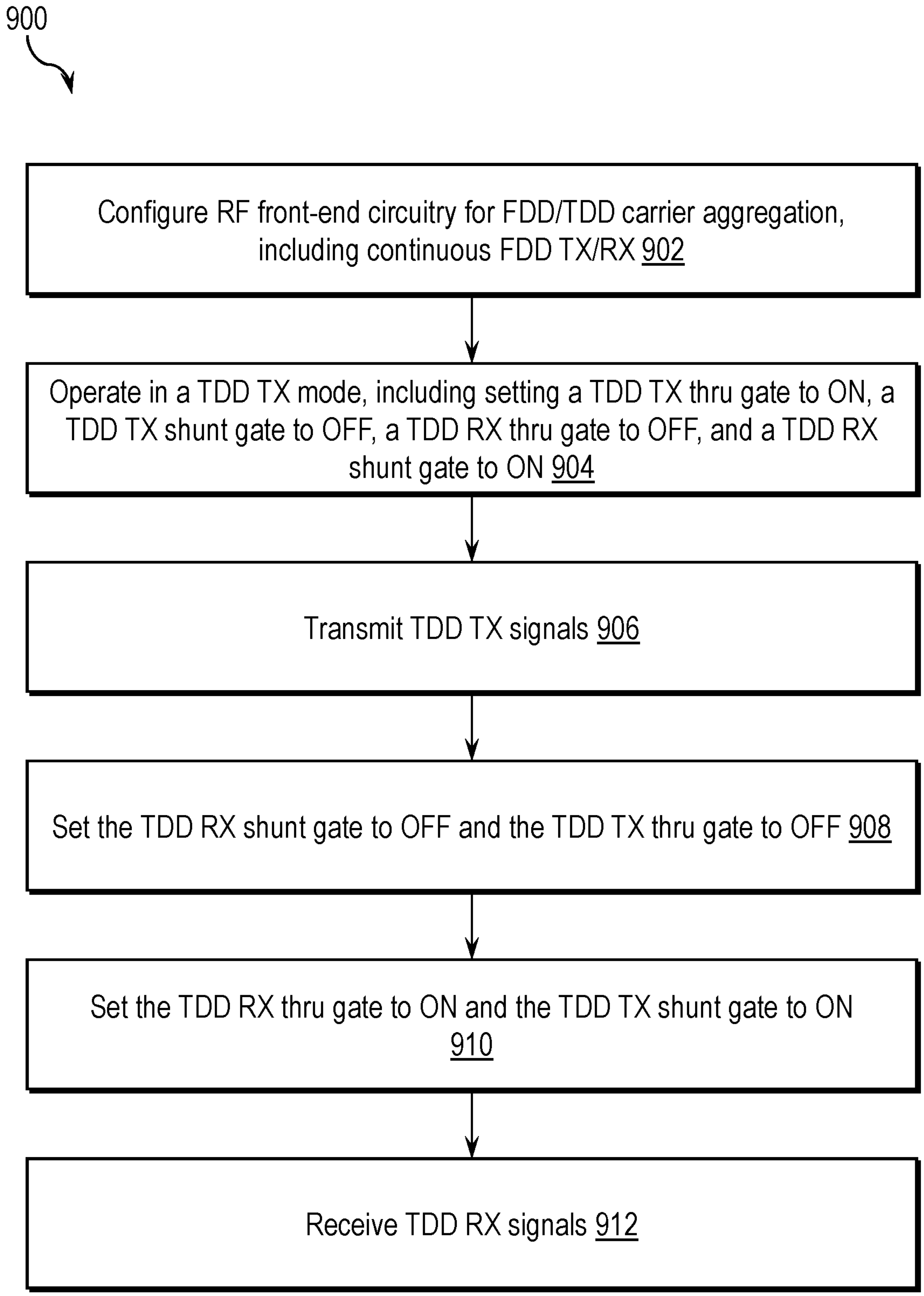
FIG. 9 illustrates an example switching process for switching between a TDD TX mode to a TDD RX mode, in accordance with one or more embodiments of the present disclosure.

FIG. 9 illustrates an example switching process 900 for switching between a TDD TX mode to a TDD RX mode, in accordance with one or more embodiments. In operation 902, RF front end circuitry (e.g., circuitry described with reference to FIGS. 1-7) is configured for FDD/TDD carrier aggregation, including continuous FDD TX/RX paths. In operation 904, the circuitry operates in a TDD TX mode, including setting a TDD TX thru switch to ON, a TDD TX shunt switch to OFF, a TDD RX thru switch to OFF, and a TDD RX shunt switch to ON. The FDD TX/RX path remains switched on for continuous processing, including setting an FDD thru switch to ON and a FDD shunt switch to OFF. In this configuration, the circuitry is configured to transmit TDD TX signals (operation 906).

In operation 908, the timing control circuitry begins transition to the TDD RX mode by setting the TDD RX shunt gate to OFF and the TDD TX thru gate to OFF. In operation 910, the timing control circuitry sets the TDD RX thru gate to ON and the TDD TX shunt gate to ON. In this configuration, the circuitry receives TDD RX signals (operation 912).

Figure 10:
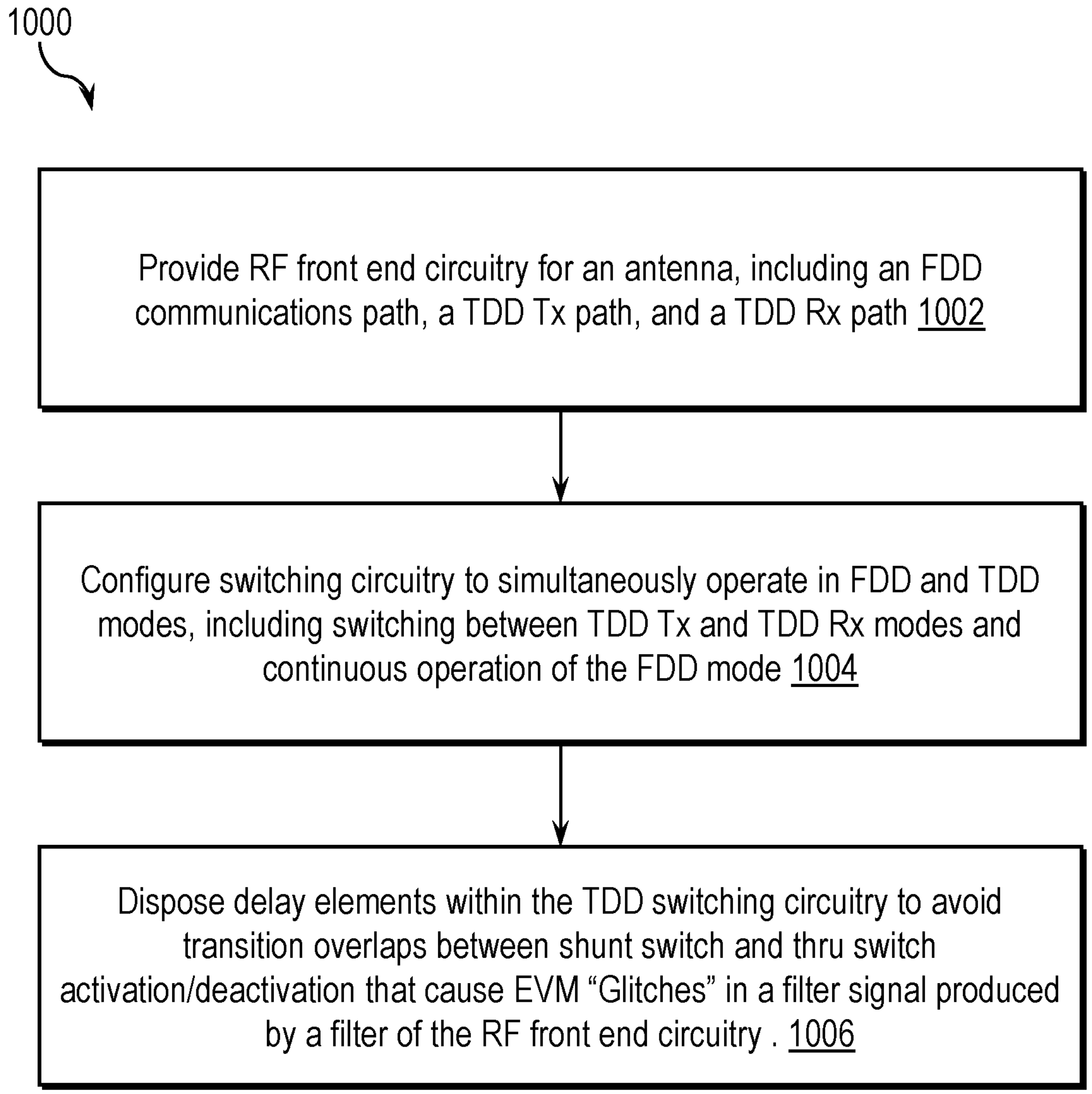
FIG. 10 illustrates an example process for configuring RF front end circuitry, in accordance with one or more embodiments of the present disclosure.

FIG. 10 illustrates an example process 1000 for configuring circuitry, for example as described herein with respect to FIGS. 1-9. In operation 1002, RF front end circuitry is provided for an antenna, including an FDD TX/RX communications path, a TDD TX path, and a TDD RX path switchably coupled to the antenna. Next, in operation 1004, the switching circuitry is configured to simultaneously operate in FDD and TDD modes, including switching between TDD TX and TDD RX modes and continuous operation of the FDD mode. In operation 1006, delay elements are disposed within the switching circuitry to avoid transition overlaps in shunt switch and thru switch activation/deactivation timing that cause EVM "Glitches" in a signal produced by a filter of the RF front end circuitry. Analysis and solutions to this problem are discussed with reference to FIGS. 2-7.

The detailed description set forth above is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using various embodiments.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the present disclosure. It should also be understood that numerous modifications and variations are possible in accordance with the principles of the present disclosure. Accordingly, the scope of the invention is defined only by the following claims.

What is claimed is:

1. A circuit comprising:

a plurality of RF signal paths;

switching circuitry configured to selectively couple the plurality of RF signal paths to an antenna port, the switching circuitry comprising, for each of the plurality of RF signal paths:

a thru switch configured to selectively couple a corresponding one of the plurality of RF signal paths to the antenna port when enabled; and a shunt switch connected to the corresponding one of the plurality of RF signal paths, the shunt switch configured to isolate the corresponding RF signal path when the thru switch is disabled; and timing control circuitry configured to sequentially activate the shunt switch on a disabled RF signal path and the thru switch on an enabled RF signal path, the timing control circuitry comprising:

a shunt control signal path comprising at least one delay element to delay a shunt control signal;

a resistor-capacitor circuit configured to receive the delayed shunt control signal from the at least one delay element; and a Schmitt trigger connected in series with the resistor-capacitor circuit and configured to condition the delayed shunt control signal for output to the shunt switch.

2. The circuit of claim 1, wherein the plurality of RF signal paths comprises a time-division duplexing (TDD) transmit signal path and TDD receive signal path; and wherein a plurality of switches is configured to alternate between the TDD transmit path to transmit a TDD signal and the TDD receive signal path to receive the TDD signal.

3. The circuit of claim 2, wherein the plurality of RF signal paths further comprise a frequency division duplexing (FDD) signal path configured to transmit and receive FDD signals.

4. The circuit of claim 3, wherein the circuit is an RF front end circuit configured to facilitate carrier aggregation.

5. The circuit of claim 4 wherein the TDD receive signal path comprises a first TDD filter configured to receive an RF signal from the antenna port and output a signal in a TDD frequency band; and wherein the TDD transmit signal path comprises a second TDD filter configured to receive RF signal from an input port and output a signal in the TDD frequency band for transmission through the antenna port.

6. The circuit of claim 2, wherein the timing control circuitry for each of the TDD transmit signal path and the TDD receive signal path, further comprises:

a thru control signal path connecting a control signal to the thru switch.

7. The circuit of claim 6, wherein the TDD transmit signal path comprises a thru control signal level shifter; and wherein the TDD receive signal path comprises a shunt control signal level shifter.

8. The circuit of claim 6, wherein the TDD transmit signal path comprise a TDD transmit signal path filter and the TDD receive signal path comprise a TDD receive signal path filter; and wherein the timing control circuitry is further configured to switch between the TDD transmit signal path and TDD receive signal path while avoiding simultaneous activation of the TDD transmit signal path filter and the TDD receive signal path filter.

9. The circuit of claim 6, wherein the timing control circuitry for each of the TDD transmit signal path and the TDD receive signal path comprises a non-overlap circuit configured to, in response to the control signal, activate one of the TDD transmit signal path and the TDD receive signal path, and deactivate the other of the TDD transmit signal path and the TDD receive signal path.

10. A method of operating the circuit of claim 1, wherein the plurality of RF signal paths comprises a first RF signal path and a second RF signal path, the method comprising:

facilitating RF communications on the first RF signal path by:

coupling the first RF signal path to the antenna port by enabling the thru switch of the first RF signal path and disabling the shunt switch of the first RF signal path; and decoupling the second RF signal path from the antenna port by disabling the thru switch of the second RF signal path and enabling the shunt switch of the second RF signal path; and switching the RF communications to the second RF signal path by providing control signals to disable the thru switch of the first RF signal path, disable the shunt switch of the second RF signal path, enable the shunt switch of the first RF signal path, and enable the thru switch of the second RF signal path; and wherein the control signals are timed to avoid simultaneous activation of the first RF signal path and the second RF signal path without interruption of RF communications via the antenna port.

11. A circuit comprising:

a first RF signal path comprising a first RF filter;

a second RF signal path comprising a second RF filter; and a plurality of switches configured to alternately couple one of the first RF signal path and the second RF signal path to an antenna port, the plurality of switches comprising:

a first thru switch configured to selectively couple the first RF signal path to the antenna port when enabled;

a first shunt switch connected to the first RF signal path, the first shunt switch configured to isolate the first signal path when the first thru switch is disabled;

a second thru switch configured to selectively couple the second RF signal path to the antenna port when enabled;

a second shunt switch connected to the second RF signal path, the second shunt switch configured to isolate the second signal path when the first thru switch is disabled; and control circuitry configured to control signal timing to the first shunt switch, first thru switch, second shunt switch, and second thru switch, to avoid simultaneous activation of the first RF filter and the second RF filter, the control circuitry comprising:

a shunt control signal path comprising at least one delay element to delay a shunt control signal;

a resistor-capacitor circuit configured to receive the delayed shunt control signal from the at least one delay element; and a Schmitt trigger connected in series with the resistor-capacitor circuit and configured to condition the delayed shunt control signal for output to the first shunt switch or the second shunt switch.

12. The circuit of claim 11, wherein the circuit is configured as RF front end circuitry for TDD/FDD carrier aggregation;

wherein the first RF signal path comprises a TDD receive signal path;

wherein the second RF signal path comprises a TDD transmit signal path; and wherein the circuit further comprises a third RF signal path comprising an FDD receive signal path comprising a third RF filter and an FDD transmit signal path comprising a fourth RF filter.

13. The circuit of claim 12, wherein the control circuitry for each of the TDD transmit signal path and the TDD receive signal path, further comprises:

a thru control signal path connecting a control signal to the thru switch.

14. The circuit of claim 12, wherein the control circuitry for each of the TDD transmit signal path and the TDD receive signal path comprises a non-overlap circuit configured to, in response to the control signal, activate one of the TDD transmit signal path and the TDD receive signal path, and deactivate the other of the TDD transmit signal path and the TDD receive signal path.

15. The circuit of claim 14, wherein the TDD transmit signal path comprises a thru control signal level shifter; and wherein the TDD receive signal path comprises a shunt control signal level shifter.

16. A method of operating a radio frequency (RF) circuit comprising a plurality of RF signal paths switchably coupled to an antenna port, the RF signal paths including a first RF signal path and a second RF signal path, the method comprising:

facilitating RF communications on the first RF signal path by:

coupling the first RF signal path to the antenna port by enabling a thru switch of the first RF signal path and disabling a shunt switch of the first RF signal path; and decoupling the second RF signal path from the antenna port by disabling a thru switch of the second RF signal path and enabling a shunt switch of the second RF signal path; and switching RF communications to the second RF signal path by providing control signals to disable the thru switch of the first RF signal path, disable the shunt switch of the second RF signal path, enable the shunt switch of the first RF signal path, and enable the thru switch of the second RF signal path;

sending the control signals through timing control circuitry comprising:

a resistor-capacitor circuit configured to receive a delayed shunt control signal from at least one delay element; and a Schmitt trigger connected in series with the resistor-capacitor circuit and configured to condition the delayed shunt control signal for output to the shunt switch; and wherein the control signals are timed to avoid simultaneous activation of the first RF signal path and the second RF signal path without interruption of RF communications via the antenna port.

17. The method of claim 16, comprising sending the control signals through the timing control circuitry comprising a non-overlap circuit configured to, in response to the control signal, activate one of the first RF signal path and second RF signal path, and deactivate the other of the first RF signal path and second RF signal path.

18. The method of claim 16, wherein the plurality of RF signal paths comprises a time-division duplexing (TDD) transmit signal path and a TDD receive signal path; and wherein the method further comprises alternating between the TDD transmit signal path to transmit a TDD signal and the TDD receive signal path to receive a TDD signal.

19. The method of claim 18, wherein the plurality of RF signal paths further comprises a frequency division duplexing (FDD) signal path configured to transmit and receive FDD signals.

20. The method of claim 18, wherein the TDD transmit signal path comprises a thru control signal level shifter; and wherein the TDD receive signal path comprises a shunt control signal level shifter.

* * * * *